March 15, 1966 P. H. BOUCHERON, JR 3,241,123

DATA ADDRESSED MEMORY

Filed July 25, 1961 3 Sheets-Sheet 1

Inventor:
Pierre H. Boucheron, Jr.,
by John P. Dell[illegible]
His Attorney.

DATA ADDRESSED MEMORY

Filed July 25, 1961 3 Sheets-Sheet 2

Inventor:
Pierre H. Boucheron, Jr.,
by John P. Pelliff
His Attorney

Inventor:
Pierre H. Boucheron, Jr.,
by John P. Dellitt
His Attorney.

United States Patent Office 3,241,123 Patented Mar. 15, 1966

3,241,123

DATA ADDRESSED MEMORY

Pierre H. Boucheron, Jr., North Syracuse, N.Y., assignor to General Electric Company, a corporation of New York Filed July 25, 1961, Ser. No. 127,459
5 Claims. (Cl. 340—172.5)

This invention relates to a memory system wherein data referral is by content and more particularly to such a system wherein comparison of the memory's contents with an interrogation and the resulting withdrawal of the desired data are substantially immediate with occurrence of the interrogation.

In general, computer-type memory systems operate on a formal address basis wherein each block of data in the memory resides at its own sequentially numbered location. In order to retrieve data from the memory system, one is required to have previous knowledge of the location or address of each item of informatin in the memory. This resort to a programmed address does not facilitate operation "on-line." Moreover if the address for some piece of information is lacking, a lengthy systematic search, item-by-item, in the memory is usually required.

Frequently, in data-retrieval systems, information is desired on a plurality of different bases. For example, one may wish to locate for further consideration all listed employees having a particular job skill, and in another instance, all employees earning a specific salary. Although the information in a memory may be sequentially "ordered" on the basis of one factor, such as the aforementioned salary information, such ordering will in general fail to be useful when data is then extracted on some different basis. A conventional large memory system with its familiar address coding will require a systematic scanning operation to withdraw the desired data.

Apparently, in the case of the human memory, recollection of well-known information is substantially immediate without resort to any indexing mechanism. Most likely "something about" the information to be retrieved is known. Then, the rest of the data is "recalled." Thus it would appear that referral is exclusively by content or partial content.

A troublesome problem area in the realization of a machine memory system permitting the immediate interrogation of the entire memory and immediate withdrawal of the desired data on the basis of partial content, is occurrence of multiple comparisons. That is, when an entire memory is interrogated with some piece of information representative of some portion of each data block in the memory, a multiple comparison will frequently occur, resulting in confusion when the memory is operated. Buffer storage would then be necessary to temporarily receive multiple outputs, with subsequent serial delivery of these outputs, one by one, to the information channel. It is in the interest of time and hardware conservation to avoid sequential mechanisms of this kind.

It is therefore an object of the present invention to provide an improved data-retrieval system wherein interrogation is on the basis of partial content and retrieval of desired data is substantially immediate.

It is another object of the present invention to provide an improved data-addressed memory system which is truly random access in that sequential scanning of the memory contents is unnecessary.

It is another object of the present invention to provide an improved data-addressed memory system which may operate on-line, provision being made for immediate read out of one of a plurality of responses.

It is another object of this inventin to provide an improved memory apparatus wherein entry and withdrawal of data is made without regard to the physical location of the data in the memory.

In accordance with a particular embodiment of the present invention the data blocks forming a memory matrix are simultaneously interrogated in parallel to compare content of these blocks with input data. Access means are responsive to an agreement and provide immediate read out of the data block giving rise to agreement.

In accordance with another aspect of the present invention, a ranking device cooperates with the memory matrix to suppress multiple interrogation responses except the first according to a predetermined order. Then the particular data block read out is invalidated by changing a digit position so that it will not immediately re-compare with the interrogation.

In accordance with another aspect of the present invention a data-addressed memory system includes a plurality of cryogenic persistent current loop circuits as memory cells as well as for read out switching, and a ranking matrix including cryogenic switching devices for insuring immediate read out of the first of a plurality of responses according to a predetermined order.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 1:
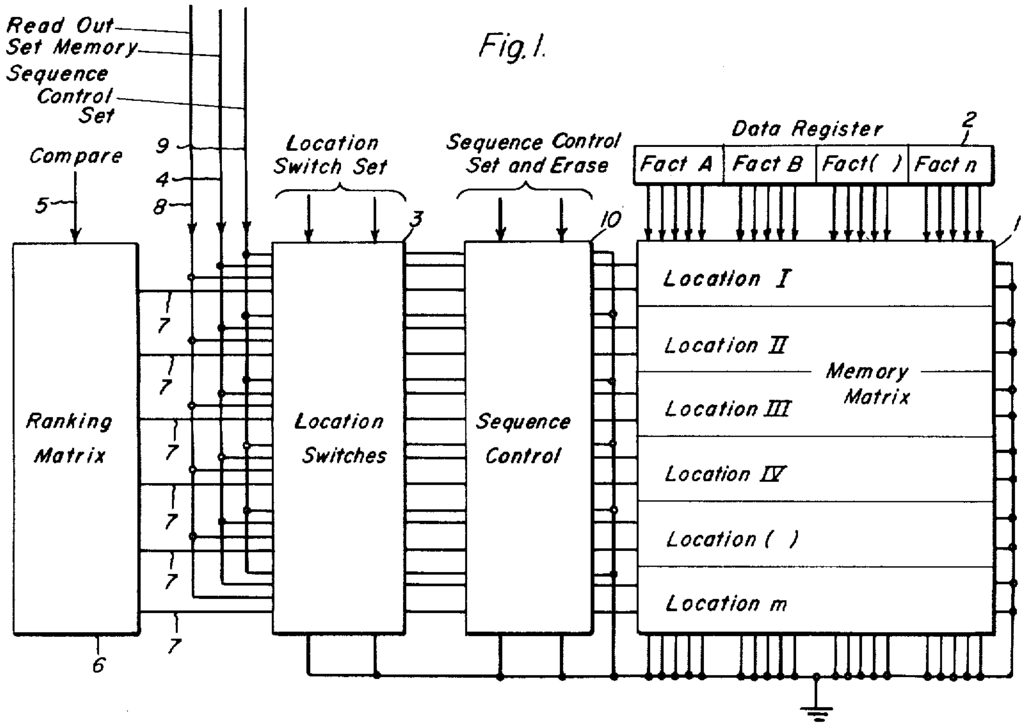
FIG. 1 is a block diagram of an illustrated embodiment of the present invention.

Referring to FIG. 1, a memory matrix 1, including rows or locations "I" through "*m*," has data entered into the various locations thereof from data register 2 which is coupled in "parallel" with the various locations. The data entered into each location from register 2 comprises a block or word of data consisting of a plurality of facts "A" through "*n*." As an elementary example, the block of data may comprise facts in a library file including the title of a book, its author, the subject and the date published. The data is selectively entered from register 2 into the various locations of memory matrix 1 through the selective operation of location switches 3, one of which, corresponding to a particular memory location, permits a "set memory" current from "set memory" buss 4 to energize the particular memory location allowing data to be entered into a location from data register 2. After the memory matrix is "loaded," the different memory locations will contain the file information for a plurality of different books.

The entire contents of the various memory locations can then be compared with an interrogating word entered in register 2. For example, if it is desired to read out the file of a book by a particular author, the said author's name is entered into the fact "B" portion of data register 2, while the other facts in the register are left vacant. Then a compare current on buss 5 is turned on to energize a ranking matrix 6, which acts to select the first location in any predetermined order which contains a file corresponding to the book by that author. A ranking matrix active conductor 7, operates the location switch corresponding to the particular location containing that file. The location switch permits one particular file and only that file to be read out on read out buss 8.

Assuming there is more than one file for a book by that particular author in the memory matrix, sequence control set buss 9 is then energized to set a sequence control cell, 10, corresponding to the already recognized file location, whereby the already recognized location becomes "invalidated." Then the compare current is again applied via buss 5 to ranking matrix 6 detecting the next location in predetermined order which contains a book file by the same author. The ranking matrix 6 will not re-recognize the same location previously read out because this location has been disqualified by sequence control 10. Therefore the ranking matrix 6 will energize the location switch for the next location in order which contains the file of a book by that author. The location switch will then allow this location and only this location to be read out via buss 8.

The "author" fact was used for interrogation in the foregoing explanation. However it may be readily appreciated that any other fact, or combination of facts, in the data block might be used for interrogation, i.e. subject, or author and title, etc.

Although a limited number of memory locations and words or facts for the data blocks are illustrated, it is apparent that the system may be enlarged to include a sufficient number of data words and locations for a particular application.

The entry of data into the register may now be considered in greater detail. Assume that some information resides in some locations of the memory matrix 1, but others are set to all zeros. Then a data block may be entered into the memory matrix in the following manner. Initially data register 2 is set to contain entirely zeros. This block of zeros is then compared with the memory matrix whereby the ranking matrix will select the first location which does not contain information. Accordingly the location switch for the first all-zero location will be energized permitting a set memory current from set memory buss 4 to reach that location. Then a block of data is inserted in data register 2 and applied to the memory matrix to coincide with a set memory current. The block of data will thereby be entered in the first location not previously containing information.

The memory matrix 1 of FIG. 1 may be of a catalog-type described and claimed in the copending application of Vernon L. Newhouse and John W. Bremer, Serial Number 47,539, filed August 4, 1960, abandoned in favor of continuation-in-part application Serial No. 382,-692, filed July 8, 1964, now Patent No. 3,182,294, granted May 4, 1965, and assigned to the assignee of the present invention.

Figure 2:
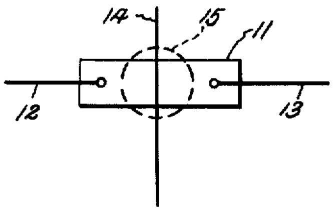
FIG. 2 is a schematic representation of a cryogenic electronic switching device employed in a particular embodiment of the present invention.

Before considering further detailed embodiments of the present invention, the operation of the cryogenic electronic switching crossover or "cryotron," found useful in specific embodiments of the present invention, will be further considered. Referring to FIG. 2, illustrating such a cryogenic electronic switching device, a first or gate film 11 having end connections 12 and 13 has extended thereacross a grid conductor 14 insulated from the gate by means of insulating layer 15. Each of these conductors is capable of losing essentially all electrical resistance at the operating temperature of the device, near absolute zero. The object of the device is to control the flow of current in the gate 11 by selectively rendering the gate resistive. The gate 11 is formed as a thin film of "soft" superconductor while the grid conductor 14 as well as end connections 12 and 13 are formed of a relatively "hard" superconductor. These terms will be further explained in connection with FIG. 3, which plots gate current vs. grid current necessary in the case of two separate cryogenic crossovers, "A" and "B," for rendering the respective gate conductor resistive. In the case of a curve "A" device, combinations of grid current and gate current to the left of curve "A," leave its gate 11 superconductive or without electrical resistance, when suitably refrigerated; however, for combinations of grid and gate currents to the right of curve "A," the gate 11 will become normally resistive due in part to the magnetic field around grid conductor 14. The curve "A" is for a "cryotron" having a gate 11 whose width $W_1$ is 2 mm., which is formed of tin, and which is crossed by a grid conductor 14 formed of lead, 30 microns wide. The tin gate material is known as a "soft" superconductor because of its property of regaining electrical resistance at relatively low values of grid current, while lead may be thought of as a relatively "hard" superconductor since grid conductor 14 remains superconductive or without resistance throughout operation of the device. As will be appreciated by those skilled in the art, other well known hard and soft superconductors may be employed in place of the tin and lead materials herein set forth.

The curve "A" device provides a useful switching function in that a current in grid 14 traversing gate 11 having a value to the right of curve "A" can be used to switch the electrical current in the underlying gate. The presence of such a current in grid conductor 14 causes resistance to appear in the gate and this resistance will deter the passage of current in the gate or force it to some alternative superconducting path in response to such grid current. A cryogenic electronic switching device of this type is described and claimed in the copending application of Vernon L. Newhouse and John W. Bremer, Serial Number 758,474, filed September 2, 1958, now Patent No. 3,076,102 and assigned to the assignee of the present invention.

Figure 3:
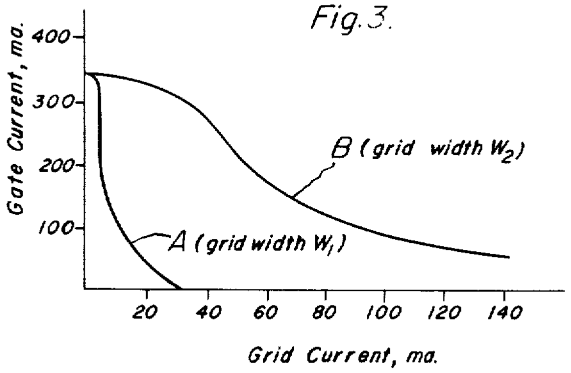
FIG. 3 is a plot of gate current vs. grid current required for rendering resistive the FIG. 2 cryogenic electronic switching device.

The curve "B" in FIG. 3 is for a cryogenic electronic crossover which is normally of the inactive type, as used in the apparatus of the present invention. The cryogenic crossover giving rise to curve "B" includes an overlying "grid" width much wider than in the curve "A" instance, i.e. the grid width $W_2$, giving rise to curve "B" is 300 microns. In accordance with the apparatus of the present invention, combinations of grid and gate current frequently lie between the two curves. In such instance a curve "B" cryogenic crossover allows the crossing conductors to remain superconducting, facilitating convenient crossing of superconductors where cryogenic switching action is not desired. Of course a "grid" conductor wider than 300 microns will also produce an inactive crossover. The feature of differentially related superconductors for providing active and inactive crossovers is described and claimed in the copending application of Vernon L. Newhouse and John W. Bremer, Serial Number 78,118, filed December 23, 1960, now abandoned, and entitled, "Cryogenic Circuitry," which is assigned to the assignee of the present invention.

A principal consideration to be noted from FIG. 3 is that physical dimensions and materials used in the cryogenic device can be conveniently chosen, so that certain specified values of grid and gate current will cause cryogenic switching, while other values may be specified which will not.

These cryogenic electronic switching devices are especially useful in the data addressed memory system according to the present invention because of their low power and heat dissipation requirements as well as their high operating speed. A very large number of such devices may be disposed on a common insulating substrate to form a large memory system in a limited amount of space. As will be appreciated, however, the invention may be practiced in its broader aspects employing other more conventional components such as magnetic cores, transistors and the like.

Figure 4:
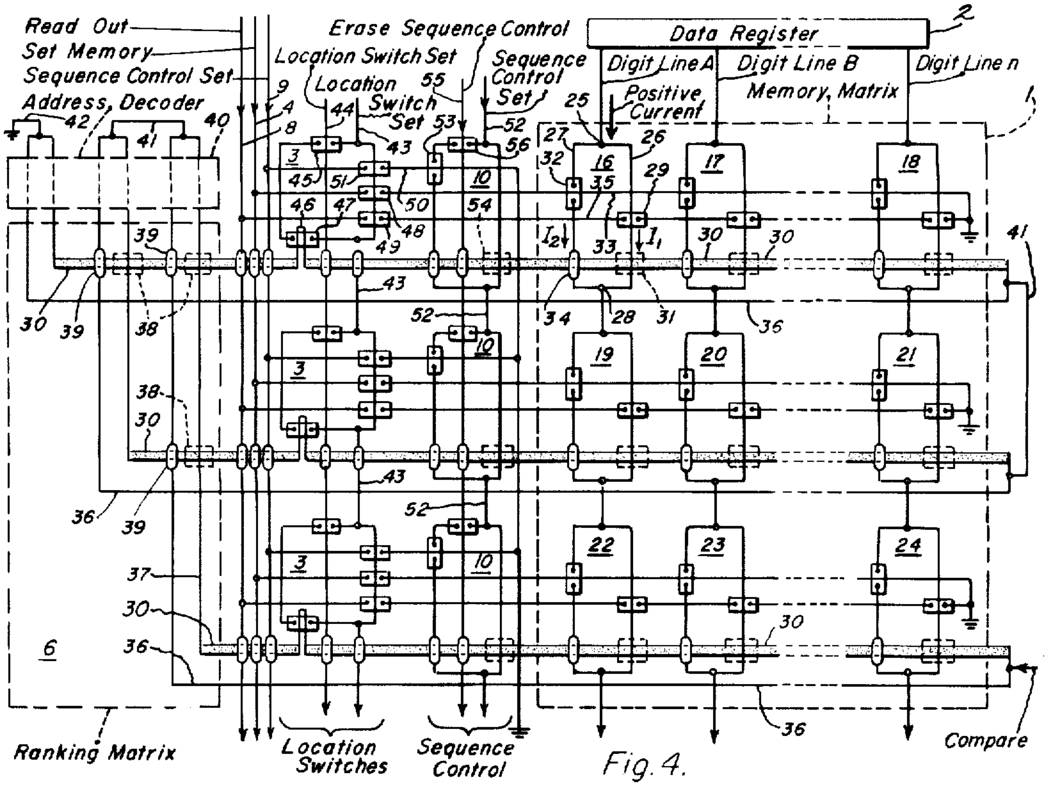
FIG. 4 is a schematic diagram of one embodiment of the present invention, including a plurality of cryogenic memory cells or persistent current loops.

FIG. 4 illustrates a data addressed memory system according to the present invention operating in the manner set forth for the FIG. 1 apparatus and employing cryotron persistent current loops as storage means. All conductors shown are capable of superconduction at the operating temperature of the apparatus, near absolute zero. The memory matrix portion of the apparatus 1, comprises, for purposes of illustration, identical persistent current loops 16 through 24. One such loop, 16, will be more particularly described. The other loops are substantially identical except for their position in the matrix.

A digit line A from data register 2 connects to persistent current loop 16 at junction 25 so a current flowing from data register 2 on digit line A has a tendency to divide between right and left conductors 26 and 27 of the loop as currents $I_1$ and $I_2$, respectively, before leaving the loop at opposite juntcion 28. The right and left conductors 26 and 27 of the loop are arranged to exhibit nearly equal overall inductance as more fully set forth in the copending application of Vernon L. Newhouse and John W. Bremer, Serial Number 47,539, filed August 3, 1960, and assigned to the assignee of the present invention.

Right conductor 26 of loop 16 crosses as a grid over first cryotron gate 29 and over a second elongated gate conductor 30 to form another cryotron in the area generally designated by the dashed outline 31. The loop's left conductor 27 serially includes a cryotron gate 32 crossed in grid relation by set memory conductor 33. Conductor 27 is widened at 34 to a width generally corresponding to at least $W_2$ in FIG. 3 to prevent cryotron switching action with regard to underlying extended active gate conductor 30 at the highest currents existing in conductor 27.

Each digit line, A through *n*, serially connects a column of loops, for example, 16, 19 and 22 in a digit column wherein the loops represent the same corresponding digit in rows of data blocks of the memory matrix. A row representing a data block residing in the memory, for example, including persistent current loops 16, 17 and 18, is intercoupled by means of set memory conductor 33, a read out conductor 35 joining cryotron gates 29, and an extended active gate conductor 30. The extended active gate conductor 30 for each memory row is paralleled with a passive superconductor 36 forming an alternative path for the current therein. Each row for each data block in the memory may be conveniently divided into portions representative of various facts entered from the data register, these facts being further subdivided into digits corresponding to the various digit lines.

Figure 5:
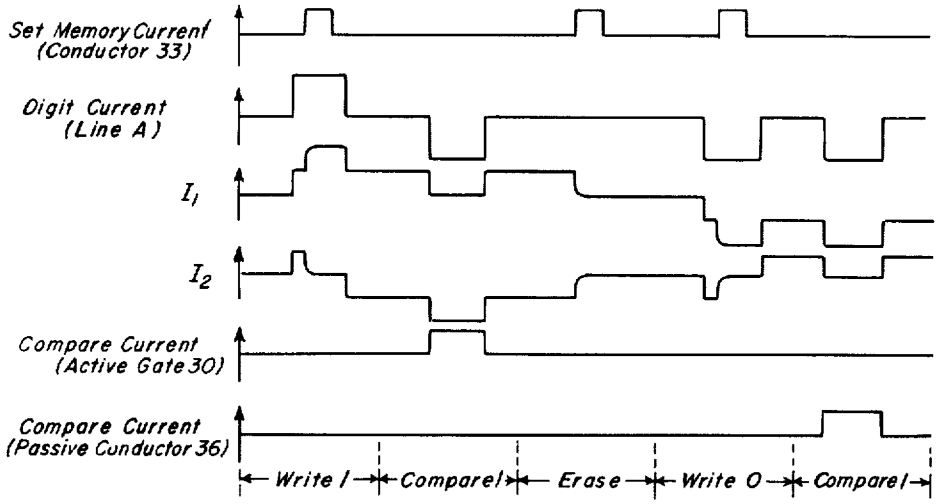
FIG. 5 is a chart of current wave forms illustrating operation of one of the memory cells in the FIG. 4 embodiment.

The operation of a persistent current loop, for example loop 16, may be illustrated by the chart of wave forms of FIG. 5. They are, from top to bottom, as a function of time, the set memory current in conductor 33, the digit current in digit line A, the current $I_1$ in right hand loop conductor 26, the current $I_2$ in left hand conductor 27, the compare current in extended active gate 30, and the compare current in passive conductor 36.

In this particular embodiment of the invention a "one" stored in a persistent current loop, for example, loop 16, is indicated by a clockwise persistent current flowing therein and a "zero" is indicated by a similar counter-clockwise current.

When it is desired to enter a "one" into the loop 16 pursuant to a "one" digit current on digit line A, the set memory conductor 33 is pulsed while said digit current flows downward from the data register 2 in digit line A. Initially current from digit line A divides approximately equally into currents $I_1$ and $I_2$ in accordance with the relatively equal inductance of conductors 26 and 27. However, when a pulse occurs on set memory conductor 33, overlying cryotron gate 32, gate 32 is rendered resistive, and all of the digit current from digit line A is forced to flow in right hand conductor 26 of the loop. When the set memory current pulse concludes, the entire digit current from digit line A continues to flow in conductor 26 since right hand conductor 26 includes no resistance and no voltage drop exists thereacross to force resumption of current through left hand conductor 27. However, the digit current on digit line A is then concluded whereupon the right hand conductor 26 develops a reaction voltage, capable of forcing reversed current in left hand loop conductor 27, thus causing a peristent current to flow in the clockwise direction around the loop. It should be noted then, in order to establish a persistent current in the loop, one branch thereof is made resistive, for example, by the provision of the set memory current in the set memory conductor 33. Advantage is taken of inductive reactance in the circuitry to establish a circulating current through a superconducting parallel branch carrying no current when the source of supply current is switched off. If this parallel branch had not been made resistive to divert its current derived from the source of supply, the reaction of this parallel branch at the conclusion of the supply current would be opposite to and prevent establishment of a circulating current. Therefore harmful persistent currents will not be unintentionally set up. Moreover, the inductive reactances and time constants of circuit conductors are in general arranged to be as low as possible.

An opposite digit current on digit line A representing a binary zero will similarly result in the storage of a counter-clockwise persistent current in the persistent current loop 16.

Assuming a clockwise current in loop 16 in dicating a binary "one" is stored, this information may be compared with or interrogated by further information in the data register 2 as follows. Digits for interrogation are entered into data register in complement form. That is an upwards current on the digit lines A through *n* will indicate a binary one, while a downwards current will now indicate a binary zero. The entire memory is interrogated by data register in a parellel or simultaneous manner, wherein the digit current from each digit line flows serially in its digit column through each persistent current loop in that column. Assume a binary-one-interrogation is indicated on digit line A, that is, an upwards current on digit line A, and assume a binary one is stored in persistent current loop 61. As further illustrated in the FIG. 5 wave form chart, at the compare-one time, the upwards (negative) digit current in digit line A will divide between right hand conductor 26 and left hand conductor 27 of the loop 16 such that interrogating curent adds to the stored clockwise current in the left hand side of the loop and subtracts from the stored current in the right hand side of the loop. Therefore, a substantially smaller current $I_1$ will flow in right hand conductor 26 across extended active gate superconductor 30, leaving this gate conductor 30 in its zero resistance or superconducting condition, and allowing passage of a "compare" current applied thereto.

If a binary "zero" had been stored, an interrogating "one" current would add to the current present in right hand conductor 26 and would render gate conductor 30 resistive as illustrated in FIG. 5, forcing a "compare" current to flow in the paralleled passive conductor 36.

If binary one is stored and a downwards or zero-interrogation digit current flows from the data register in digit line A, this digit current in digit line A dividing between conductors 26 and 27 of the loop will also add to the circulating current in the right hand conductor 26 and subtract therefrom in left hand conductor 27. The extended active gate conductor 30 forming the cryotron gate under right hand conductor 26 is then rendered resistive to indicate a lack of agreement between the stored digit and the interrogation.

In like manner comparison of a binary zero with a binary zero will leave gate conductor 30 superconducting.

In each instance, the currents from register 2 are chosen so addition of stored circulating current and interrogating current is required to render the extended active gate conductor 30 resistive; that is, both these currents are required to add up to a grid current to the right of curve A in FIG. 3. To aid this end, conductor 26 may be very slightly widened where it crosses gate conductor 30.

Since extended active gate conductor 30 extends as a gate under the right hand conductor of each of the persistent current loops for a row of such loops, the extended active gate conductor 30 will be rendered resistive only by disagreement between an interrogation on any of the digit lines "A" through "*n*" and corresponding stored digits in the persistent current loops. Then when a "compare" current is applied to the parallel combination of extended active gate conductor 30 and passive conductor 36, the "compare" current will be forced to flow in the passive conductor 36. However, if agreement exists between the interrogation presented on the digit lines and the corresponding digits of a particular row or data block, then current will flow in extended active gate conductor 30 in preference to passive conductor 36. This is because the active gate conductor 30, being wider, presents much less inductance and therefore less impedance to the flow of current than the alternative parallel path consisting of passive conductor 36.

The above action is further illustrated by the FIG. 5 chart of wave forms; as indicated, when a "one" written as a clockwise current in a persistent current loop is interrogated with a one from data register 2, a compare current presented to the parallel combination of the active gate conductor 30 and passive conductor 36 will flow in the active gate conductor 30. However, when a zero is written in a persistent current loop and interrogated with a one from data register 2, a compare current presented to the parallel combination of the active gate and passive conductor will flow in the passive conductor, etc.

Agreement between a row or data block of persistent current loops and an interrogation from the data register will occur for an interrogation in the register 2 having a number of digits smaller than the full content of the data block or row. This is because the combination of a circulating current and a similarly poled interrogating current is required to render extended active gate conductor 30 resistive. That is to say, only a positive disagreement between a data block and the interrogating information in the data register will cause the extended active gate conductor 30 for a particular row or data block to become resistive. Portions of the data register which contain no interrogation may be merely left blank, so they supply no interrogating digit line currents. Thus, as discussed in connection with FIG. 1, the memory matrix will compare with a particular fact or a group of digits corresponding to a small portion of the row or data block, and, providing there is agreement, the entire data block may then be read out.

In accordance with a feature of the present invention, a ranking or selecting arrangement cooperates with the memory matrix to select the first of a possible plurality of data blocks or rows whose information agrees with the interrogation in the data register, in accordance with some predetermined order. Referring again to FIG. 4, a ranking matrix 6 comprises extended active gate conductors 30 and passive conductors 36 serially coupled to those in the memory matrix, completing a parallel circuit for each combination of the active and passive conductors for each row or data block in the memory. In the ranking matrix 6, each extended active gate conductor 30 has extended thereover a grid conductor 37, serially associated with each previous active gate conductor in the matrix in accordance with a predetermined order; for example, the order may be the physical placement of the data blocks or rows and the digit positions thereof in their illustrated distance from data register 2. Conductors 37 act as cryotron grids with respect to the underlying active gate conductors in the areas indicated by dashed rectangles 38 so that a current flow in such grid conductors 37 renders the underlying gate conductors 30 resistive thus forcing the current which would otherwise flow in the gate conductor 30 for a particular row to flow in the passive conductor path; this occurs even through an agreement may also exist between stored data in such a row and an interrogation in the data register. Therefore, only one comparison or agreement between the interrogation in the data register and one data block in the memory will result. In the case of the specific embodiment of FIG. 4, only the agreeing data block or row farthest away from the data register will indicate agreement with interrogation in the data register, and pass a current on its extended active gate conductor since each other possible agreeing row will be inhibited from indicating agreement by the corresponding grid conductor 37 in ranking matrix 6. This selection eliminates confusion as to the particular data block to be immediately read out.

In accordance with the circuitry of FIG. 4, the parallel combinations of active and passive gate conductors for each row are serially connected on alternate sides of the memory matrix so a compare current coupled to one end of the parallel combination for the bottom row flows back and forth across the matrix passing through a conductor of each parallel combination. On the ranking matrix side of the memory matrix the grid conductor 37 completing the parallel path of its serially associated active gate conductor 30, together with the corresponding passive conductor 36, is "folded" over all remaining parallel combinations for all other rows thereabove. Both grid conductors 37 and the passive conductors crossed by conductors 37 in this area are formed of lead and are of similar narrow dimension; therefore no cryotron switching action is exhibited by their crossovers. Also no cryotron switching action occurs where the lead passive conductor crosses another lead passive conductor. Where each passive conductor crosses over an extended gate conductor (formed of tin), cryotron switching action would be possible except that the passive conductors are widened as at 39 where these crossovers occur. The width of the passive conductors at this point is such that current flowing therein is insufficient to produce switching of the underlying gate; that is, the current in the passive conductor lies between curves A and B of FIG. 3, where the passive conductor has a width at least corresponding to $W_2$ in FIG. 3.

On the remote side of the ranking matrix from the memory matrix, after parallel combinations for each memory row have crossed the parallel combinations for each of the remaining rows from the memory matrix, each parallel combination may pass through an address decoder 40 wherein the memory row whose extended active gate conductor carries a current may be registered. Beyond the address decoder, the parallel combinations are completed for each row and pairs of such parallel combinations are interconnected at 41 to complete the serial arrangement of all such parallel combinations. The last combination is grounded at 42.

The aforementioned ranking matrix is disclosed and claimed in the copending application of Vernon L. Newhouse entitled, "Ranking Matrix," Serial Number 126,707 filed concurrently herewith and assigned to the assignee of the present invention.

In accordance with another feature of the present invention, detection of a memory matrix row or data group acts immediately to open a gate or a location switch through which access is gained to the entire data block for which agreement is indicated. These location switches 3 in FIG. 4 each comprise a persistent current loop initially set to support a circulating curent therein, but whose circulating current is shut off by indication of similarity between the data block in a particular row and the interrogation in the data register. Initially, that is before the memory system is used to make any comparison, location switch set buss 43 is provided with a current which flows through each side of each location switch 3, dividing substantially equally therebetwen. The switch set current flows serially between loops through buss 43. Buss 43 is widened at points where it crosses extended active gate conductors 30 to prevent rendering such gate conductors resistive in the same manner as are other busses crossing thereover for which cryotron switching action is not indicated.

Then, location switch set buss 44 is pulsed rendering resistive a cryotron gate 45 included in one side of each location switch 3. This inhibits current on the corresponding side of each location switch and forces the current from location switch set buss 43 to flow in the remaining side of each location switch 3. Then current on location switch set buss 43 is discontinued, the resulting reaction voltage setting up clockwise currents in each location switch 3.

The extended active gate conductor 30 for each row serially includes a short grid portion 46 formed of lead overlying a tin cryotron gate 47 serially included in each location switch 3. Then when a "compare" current is applied to the active and passive conductors, one and only one of the active gate conductors 30 associated with a particular memory row may carry a current indicating identity between the information in the data register and the data stored in that row. The cryotron grid 46 serially included in the active gate conductor 30 for that row will render the underlying gate 47 resistive, thereby destroying the circulating current in the location switch for that one row.

As may be observed from FIG. 4, set memory conductor 33 serially includes a cryotron gate 48 underlying a portion of persistent current loop comprising location switch 3. Also, read out conductor 35 includes a cryotron gate 49 in series therewith influenced in its superconductivity by the current in location switch 3; likewise sequence control set conductor 50 serially includes a cryotron gate 51, underlying the persistent current loop of location switch 3. Therefore while persistent current continues to flow in the persistent current loop of location 29, the corresponding memory matrix row is effectively disconnected from currents which may be supplied on busses 4, 8 and 9, respectively. However, when current flows in the extended active gate conductor 30 for a particular row, the circulating current in the corresponding location switch 3 is shut off permitting immediate access to that row for which agreement is found.

Serial read out can be accomplished by pulsing read out buss 8 and simultaneously interrogating each digit line from the data register in order, thereby determining the contents of each persistent current loop for the particular data block or row. Each interrogating current will render resistive cryotron gate 29 for a particular loop if interrogating and stored currents add on the right hand side of the loop but such gate will not be affected if the interrogate and stored currents subtract.

Read out is non-destructive. If data is to be removed from a row (erased), the set memory conductor for that row is energized through the row's location switch while all zeros are held in the data register 2. Immediate parallel (and non-destructive) read out is also possible in a manner hereinafter more fully described.

If no row of the memory matrix responds to an interrogation and if therefore no location switch opens the read out, set memory, and sequence control set conductors for any row, then it is understood that read out, set memory and sequence control set currents flow on busses 8, 4 and 9 in alternative but higher inductance paths (not shown).

In accordance with another feature of the present invention, after one of a plurality of memory data blocks or rows responsive to a particular interrogation is selected by the ranking matrix 6, resulting in the operation of one of the location switches 3, the same row is disabled or invalidated from immediately giving rise to a second response to the same interrogation. The next responsive row in sequence may then be read out. This sequencing operation is accomplished by means of sequence control cells or loops 10, one being associated with each row or data block in the memory matrix.

After detection of a particular row results in opening corresponding location switch 3, and after the data for that row is read out, a sequence control set current is applied serially through a sequence control conductor 52 to sequence control loops 10 and tends to divide between the left hand side and the right hand side of each loop. Then a sequence control set current is applied on sequence control set buss 9 through an open cryotron gate 51 to conductor 50 rendering resistive cryotron gate 53 included in the left hand side of the corresponding sequence control loop 10. Rendering resistive the left hand side of the particular control loop 10 forces the sequence control set current from conductor 52 into the right hand side of that loop. The sequence control set current on conductor 52 is then discontinued resulting in a reaction voltage causing a clockwise persistent current to exist in the sequence control loop 10 corresponding to the row in the memory matrix which gave rise to favorable comparison. The current circulating in loop 10 will be approximately one-half the value of the discontinued sequence control set control on conductor 52. The sequence control set current value is chosen such that this one-half value will be sufficient to maintain resistive the extended active gate conductor 30 underlying the sequence control loop 10, by cryotron action, as indicated at 54. A second or repeated recognition or indication of similarity for the same row in the memory is rendered impossible as long as the circulating current continues to flow in its sequence control loop 10. The second presentation of the same interrogation from data register 2 will then lead to the selection of a second matrix memory row by the ranking matrix, this time a row between the previously detected row and the top of the matrix in FIG. 4; this is because the extended active grid 30 for the previously detected row has been rendered resistive, which bypasses the compare current for that row to line 36, and therefore the serially associated grid conductor 37 is incapable of inhibiting an extended active grid conductor 30 for the next comparing row in the predetermined order.

The sequence control loops thus cause the invalidation of each detected row whereby the same row will not be detected again but rather the next comparing row will be detected. Then a circulating current is set up in the sequence control loop for the second detected row, etc., until all comparing data blocks or rows of the matrix have been detected and read out. After a sequence of rows responsive to a particular interrogation have been detected, erase sequence control conductor 55 is energized, conductor 55 crossing in grid fashion a cryotron 56 included serially in each sequence control loop, thereby destroying the circulating current in each sequence control loop.

General operation of the FIG. 4 apparatus will now be reviewed. Location switches 3 for the entire memory are first "set" with circulating currents. An interrogate word comprising all zeros is entered into the data register and then a compare current is connected to the active and passive conductors 30 and 36 which pass through the ranking matrix. The first row in the memory matrix containing all zeros, or alternatively containing no information, that is without circulating currents therein, will permit energization of its extended active gate conductor 30 resulting in turning off the circulating current in the corresponding location switch 3. Then data for this vacant location is entered into data register 2 and supplied as currents on digit lines A through *n*. Set memory conductor 33 is pulsed through the open location switch 3 causing entry of the data block from the data register into the vacant location. Other data blocks are entered into the memory matrix in similar fashion. Between insertion of data blocks, circulating currents are re-established in location switches 3. All "unused" rows are then initially filled with zeros.

Before interrogating the memory matrix with a fact which may compare with one of the data blocks in the memory matrix, circulating currents are established in each of the location switches 3. Then, an interrogating word entered in the data register, is presented on some of digit lines A through *n*, using interrogate currents which are reverse to the currents employed when the stored data was entered in the memory matrix from the data register. During such time as such interrogating currents are present, a compare current is coupled to all parallel active gate conductors 30 and passive conductors 36 by means of their serial arrangement including ranking matrix 6. The first active gate conductor 30 (most remote from data register 2) which indicates comparison of its corresponding row with the interrogation in the data register will interrupt the location switch circulating current for that row. No other location switches will be opened, however, since grid conductor 37 in series with the first active gate conductor 30 inhibits conduction in all subsequent gate conductors 30. The open location switch for the comparing row permits read out of the entire data block stored in that row after which the sequence control loop for that row is set with a circulating current inhibiting the active gate conductor 30, whereby the same row will not be reselected. The location switches 3 are then reset with circulating currents. Assuming correspondence of more than one row in the memory with an interrogation, the interrogation in the data register is recompared with the memory matrix in the above manner, but this time the next most remote row which compares with interrogation in the data register will respond and open its corresponding location switch so that access is granted to that row for read out purposes.

If further data is to be entered into the memory matrix, interrogation is carried out with an all zero word for detecting the first all zero location in the matrix which therefore contains no information. Then the additional data block is entered into this location via the data register.

The apparatus illustrated in FIG. 6 comprising a second embodiment in accordance with the present invention is substantially the same in construction and operation as the embodiment already set out in respect to like portions and like reference numerals, with those changes and additions hereinafter described.

Figure 6:
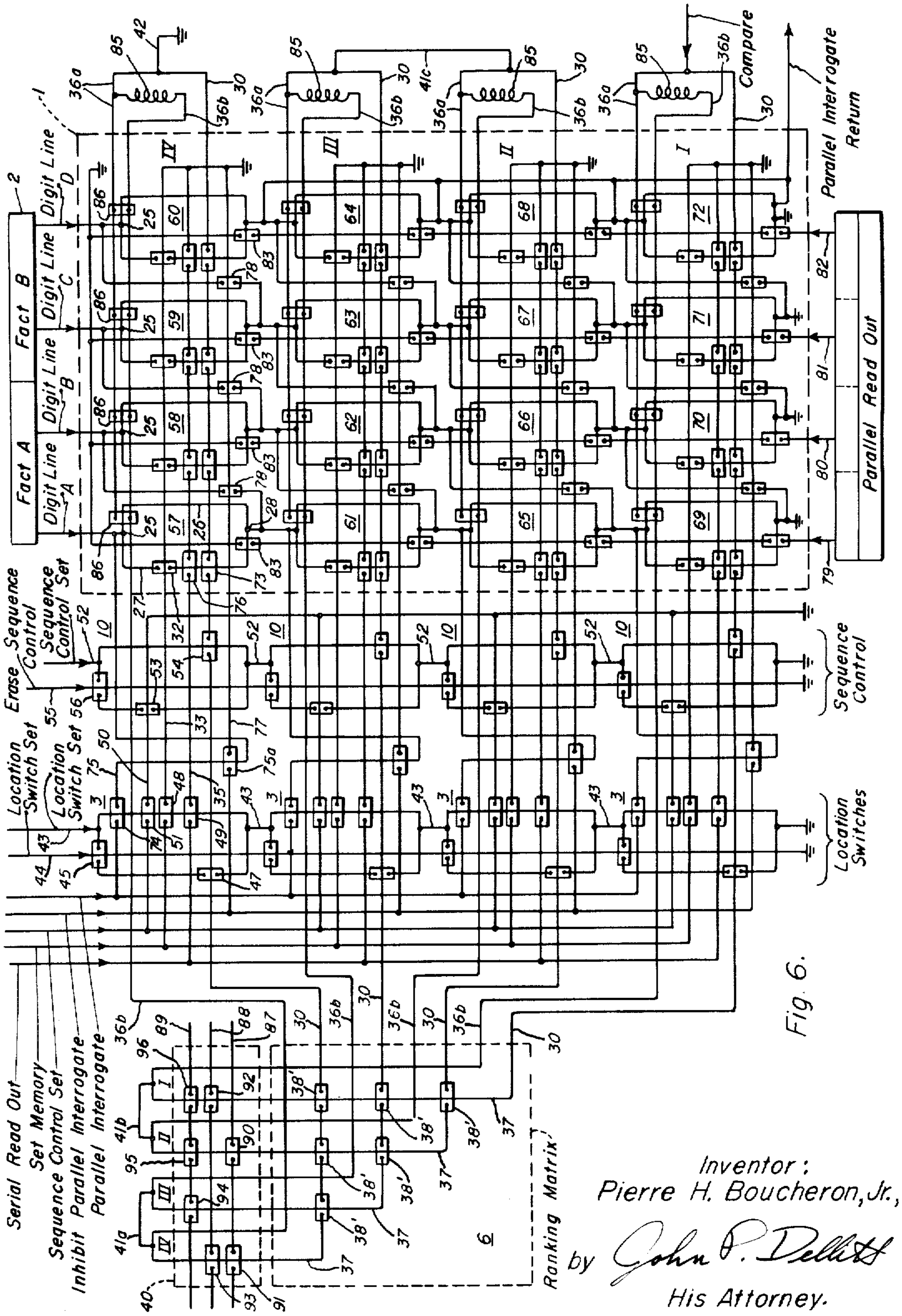
FIG. 6 is a schematic diagram of another embodiment of the present invention.

The FIG. 6 apparatus is shown as employing said cryogenic electronic switching devices or cryotrons throughout for the sake of illustrative convenience although it is appreciated that two or more serially related cryotrons may be replaced with an elongated strip of "soft" superconducting material, for example, tin, whereby narrow crossing conductors formed of lead comprise a cryotron switching device therewith, while crossing conductors of comparable width do not comprise a switching device. All conductors in the FIG. 6 apparatus are capable of superconduction at the operating temperature for the apparatus, near absolute zero.

In accordance with an additional feature illustrated in the FIG. 6 embodiment, immediate parallel or simultaneous read out of a complete data block is facilitated in response to comparison of an interrogation in data register 2 with a portion of the said data block in the memory matrix 1.

In accordance with another feature illustrated in the FIG. 6 embodiment, the interrogation in data register 2 may be of the same current polarity as the current polarities on the digit lines employed to originally insert data into the memory.

As in previous embodiments, data blocks here consisting conveniently of facts A and B, are first entered from data register 2 into the rows of persistent current loops 57–60, 61–64, 65–68, and 69–72 of memory matrix 1. Then one additional fact, for example, a fact A is entered into the data register 2 for simultaneous comparison with the fact A portion of all of the data blocks stored in rows of the memory matrix 1. Providing at least one of the rows compares favorably with the interrogation, the location switch 3, corresponding to that row, opens, allowing access to the comparing row. The entire data block in that row comprising fact B as well as fact A may be read out in either parallel or serial manner under the control of the open location switch.

Assuming more than one row contains a fact A, which compares with the interrogation, the active conductor 30 for the first comparing row in a predetermined order carries a current which inhibits the active conductors 30 for each subsequent row in the predetermined order thereby facilitating immediate selection of only the said first row. This inhibiting function is established by ranking matrix 6 which, as previously stated, is disclosed and claimed in the aforementioned copending application of Vernon L. Newhouse, filed concurrently herewith.

After the data block, a portion of which compares with the interrogation in register 2, is read out, the corresponding sequence control loop 10 is energized through the open location switch and acts thereafter, until shut off, to invalidate or effectively add a different digit to the said data block so that this data block will not immediately recompare with the same interrogation in data register 2. Then, a second data block stored in a second row in said predetermined order will be able to compare with the same fact A in data register 2, after which this second data block may be read out.

Considering the FIG. 6 data addressed memory apparatus in greater detail, the memory matrix 1 comprising a plurality of cryogenic persistent current memory loops 57–72, stores a plurality of data blocks in consecutively numbered rows thereof. Each data block is broken down into a plurality of facts, further broken down into digits. Unused rows are arranged to store all zeros. Information from data register 2 is entered for storage into a particular memory loop, for example, loop 57, in the following manner. A "one," for example, is provided as a downward current on a digit line "A." This downward current on digit line A tends to divide equally at junction 25 between the right hand side 26 of the loop 57 and the left hand side 27 of the loop 57, leaving the loop at opposite junction 28. During the presence of such digit line current, a set memory pulse is provided on set memory conductor 33 overlying cryotron gate 32 serially included in the left hand side, 27, of loop 57. This set memory pulse renders the gate 32 resistive thereby inserting resistance in the left hand side of the loop. Since the right hand side 26 of loop 57 is superconducting, the current on digit line A will flow entirely in the right hand side 26 of the loop before leaving the loop at junction 28. Then when the current in digit line A, representative of the binary one, is discontinued, a reaction voltage on the right hand side 26 of loop 57, due to the inductance thereof, causes a current to flow in an upwards direction in left hand side 27 which is now superconducting. A circulating current then continues in the loop representing the binary one from data register 2.

In like manner, digits are simultaneously inserted in persistent current loops 58, 59 and 60, of the same row.

After manipulation of the location switches, in a manner to be described, other data blocks are inserted in other rows of the memory. In this memory, a zero is stored as a counter-clockwise current in a memory loop, with an upwards current in a digit line from data register 2 representing a zero in the data register.

As stated, the principal function of the FIG. 6 apparatus is to compare one portion of an interrogating data block, for example, a fact A with the fact A portions of each row in the memory to indicate a row or rows storing an identical fact A portion. Thereafter, the entire data block or word comprising facts A and B stored in that row is immediately read out. Before comparison, circulating current are first established in location switches 3. Then an interrogation in data register 2 consisting of fact A, for example, presented as currents on digit lines A and B (of the same polarity direction as used in loading the memory) is simultaneously compared with each row in the memory. Assume a "one" is presented on digit line A which would compare with the "one" stored in persistent current loop 57 as a clockwise circulating current therein. The current on the digit line will divide between the right hand side 26 and the left hand side 27 of the loop, leaving at junction 28, and will be superimposed on the clockwise circulating current stored in the loop. It is noted this current will add to the circulating current stored in the loop on the right hand side 26, of the loop, but will subtract from the circulating current on the left hand side 27, of the loop. A cryotron gate 73 underlying the left hand side 27 of the loop will remain superconducting since the left hand side of the loop 27, superposed with respect to gate 73, carries very little or no current.

If the cryotron gates 73 for an entire row of the matrix remain similarly superconducting a current will be permitted to flow in active conductor 30 serially including the gates 73 for each persistent current loop of a row in the matrix, and a coincidence with the interrogating information in the data register 2 is thereby indicated.

The digit line currents setting up the circulating currents and the gates 73 together with their overlying superconductor are selected such that the circulating current produced is not sufficient by itself to render a gate 73 resistive, but only the addition of the circulating current and a digit line current is sufficient for rendering it resistive. Therefore a resistive gate 73 indicates an actual disagreement between interrogating current on a digit line and a persistent current in a persistent current loop in the memory. It therefore follows that the rows of the memory may be interrogated by partial information inserted in register 2, for example, fact A, and the lack of information in other portions of register 2, for example, fact B, will have no effect on cryotron gates 73. Then if interrogating information in the data register 2, for example, fact A agrees with the fact A portion of any row in the memory matrix, the active conductor 30 for that row will remain superconducting insofar as the memory matrix is concerned, indicating agreement for its particular row.

As an interrogating fact in data register 2 is compared with the data blocks stored in the rows of the memory a "compare" current is applied to the respective active conductors 30 associated with each row in the memory. If a row contains information coinciding with the interrogating fact, the conductor 30 is maintained superconducting in the aforementioned manner permitting passage of the "compare" current. The compare current in active conductor 30 for the agreeing row then passes over cryotron gate 47 included in the location switch 3 corresponding to that row and destroys the circulating current stored in that location switch. The location switches for other rows will continue to store circulating currents, however, cryotron gates 48, 49, 51 and 74 underlying the location switch corresponding to the agreeing row will remain superconducting in the absence of a circulating current in the location switch, permitting the possible passage of current on conductors 33, 35, 50 and 75, effectively flowing through the "open" location switch. The information in the row may be serially read out on serial read out conductor 35, if desired, by pulsing each digit line in order, and noting the effect on the line 35 which serially includes a cryotron gate 76 under each persistent current loop in the row.

Information is read out in a parallel or simultaneous fashion in the following manner. An inhibit parallel interrogate current normally flows through conductor 77 for each row and across cryotron gates 78 which connect the bottom junction 28 of each persistent current storage loop in the memory with the top junction 25 of the persistent current loop for the next digit in the same row. When a row compares favorably upon interrogation, current in inhibit parallel interrogate conductor 77 is shut off with the concurrent application of a parallel interrogate current on conductor 75. This current passes through the grid of a cryotron 77*a* included in conductor 77 preventing flow of current in conductor 77. The current on conductor 75 further passes through cryotron gate 74 of the open location switch for the particular row which compared favorably. Then this current flows into junction 25 of the first persistent current loop in that memory row, out junction 28, through the now superconducting cryotron gate 78, to junction 25 of the next persistent current loop and so on, through each of the loops in a memory row, to ground. At the same time a parallel read out current is applied on lines 79 through 82. Each of these lines includes a serial arrangement of cryotron gates 83. The cryotron gates in any particular one of these parallel lines passes under the left hand side 27 of each of the persistent current loops for a given column in the memory. If the parallel interrogate current from line 75 encounters a "one" or clockwise circulating current in a memory loop, for example loop 57, the current from line 75 will add to the current on the right hand side 26 of the memory loop and subtract on the left hand side 27 of the memory loop from the stored clockwise current therein. The corresponding cryotron gate 83 which is connected in read out line 79 will remain superconductive, and therefore line 79 will permit passage of an unimpeded current indicative of a binary one in storage loop 57. In like manner, the current from line 75 will serially pass through each persistent current loop in the same row. The current flow or lack of current flow on lines 79 through 82 in response to an application of current thereto, simultaneously indicates the contents for the selected memory row. Current flow indicates a binary one and absence of current flow, a zero. Alternative higher inductance paths (not shown) are provided for each of the parallel read out currents, for current bypass when a read out line encounters a resistive cryotron gate 83 indicative of a binary zero in the corresponding persistent current loop. After parallel read out, the parallel interrogate current on line 75 is concluded and the inhibit interrogate parallel current on line 77 is resumed to render resistive the cross-connections comprising cryotron gates 78 between the loops of a row in the memory matrix.

Between each comparison circulating currents are set up in location switches 3 in the following manner. First, a location switch set current is provided on location switch set conductor 43 serially joining opposite ends of location switches 3, each consisting of a closed loop circuit. Then, location switch set conductor 44 which overlies cryotron gate 45 included in the left hand side of each location switch 3, is pulsed, rendering the left hand side of each location switch 3 resistive. Then the current in location switch set conductor 43 is terminated, resulting in clockwise circulating currents being set up in each location switch 3.

The ranking matrix 6 enables one of a plurality of responses in the ranking matrix to be immediately selected while other responses in a predetermined order are inhibited. Should more than one row in the matrix contain a fact corresponding to the interrogating fact in the data register 2, the active conductors 30 for two or more rows will attempt to pass current upon the application of a "compare" current to the serial combination of such active lines 30 in the memory. However, each line 30, for each memory row has paralleled thereacross a passive conductor comprising the serial passive conductors 36*a* and 36*b*. The passive conductor 36*a* is coupled to passive conductor 36*b* through inductance 85 in parallel with a number of cryotron gates 86 each of which underlie the right hand side 26 of each of the persistent current memory loops in the row. Each inductance 85 may comprise a narrow extended superconductor if desired. The gates 86 together with their overlying superconductors are constructed to be rendered resistive by a loop circulating current; therefore a disagreement with an interrogation, causing near cancellation of current on the right hand side of the loop, is required for a gate 86 to become superconductive. The parallel connection of the active and passive conductors, for example for the top row in the matrix, is completed through ranking matrix 6 as at 41*a* where such parallel connection is coupled to the parallel connection of active line 30 and passive line 36*b* for the next row in the memory matrix.

The ranking matrix 6 includes active conductors 30 and passive conductors 36*b* from each row, numbered I through IV in the memory matrix 1. Each active line 30 serially includes a cryotron gate 38' for each lower numbered row in the matrix; these cryotron gates 38' are traversed in grid relation by the active conductors for each lower numbered row. Therefore the first row of rows I through IV whose active conductor 30 carries a current will be effective through the medium of this current to inhibit any indication of similarity by each subsequently numbered row by placing resistance in the active line 30 for each subsequently numbered row.

Assume both row IV in the matrix comprising memory loops 57 through 60 and row II comprising loops 65 through 68, each give rise to indication of comparison with an interrogating fact so that both an active conductor 30 associated with row II and that associated with row IV are superconductive. A "compare" current applied in series with all the active conductors and their paralleled passive conductors will flow through one of the cryotron gates 86 in row I (comprising loops 69 through 72) since one of them will be superconducting due to a lack of comparison, rather than through active conductor 30 which will be non-superconducting. The current will then flow through passive conductor 36*b* for row I to the cross-connection 41*b* beyond ranking matrix 6. Since row II compares with the interrogation, the current will flow through active conductor 30 for row II. No current can flow through gates 86 in row II since all will be resistive. Moreover, very little current will flow in the high impedance path comprising inductance 85 since the current will prefer the lower impedance path 30.

Active conductor 30 for row II passes as a cryotron grid over a pair of cryotron gates 38' and serially includes another cryotron gate 38' whose grid is the active conductor 30 for row I. However, as previously noted, active conductor 30 for row I carries no current and therefore the active conductor 30 for row II remains superconducting.

The compare current flows through the active conductor 30 for row II and then crosses connection 41*c* and through one of the cryotron gates 86 for row III, inasmuch as no indication of agreement exists between the data in row III and the interrogation. Thence the compare current flowing through passive conductor 36*b* for row III and cross-connection 41*a*, attempts to flow in active conductor 30 for row IV. However, conductor 30 for row IV includes a cryotron gate 38' traversed by the current in the active conductor 30 for row II. Therefore, rather than flowing in active conductor 30 for row IV the compare current will be forced to flow in passive conductor 36*b* for row IV, and through the inductance 85 associated with row IV and thence to ground 42, inasmuch as none of the cryotron gates 86 are superconducting.

It is seen that only the location switch 3 for the agreeing location, row II, will be opened, for immediate read out of the data therein, thereby avoiding confusion between rows II and IV. The data in row IV can be subsequently read out.

Address decoder 40 is a circuit means for determining the binary representation of the particular comparing row detected by the apparatus. The decoder conveniently includes superconducting lines 87, 88 and 89 each of which may have a source of current applied thereto. Line 87 corresponds to the lowest ranking digit in a binary sequence, and a current will flow unimpeded by resistance in line 87 if the lowest ranking digit of the binary sequence is indicated. In like manner lines 88 and 89, if they remain superconducting, indicate the presence of second and third binary digits. Line 87 includes cryotron gates 90 and 91 which are traversed in grid relation by the active lines 30 for rows II and IV of the memory matrix. Line 88 serially includes cryotron gates 92 and 93 traversed in grid relation by the active lines 30 for rows I and IV of the memory matrix. Line 89 serially includes cryotron gates 94, 95 and 96 traversed in grid relation by the active lines for rows I, II and III. The decoder functions to deliver the parallel binary address on lines 87, 88 and 89 of the row in the memory matrix which compared with the interrogation. It indicates the fact that a comparison took place as well as the address of the comparing row. Consider the situation described where row II in the memory matrix was detected. The current flows in active conductor 30 for row II inhibiting current flow in first digit line 87 by rendering resistive cryotron gate 90 and inhibiting current flow in third digit line 89 by rendering resistive cryotron gate 95. However, neither cryotron gates 92 nor 93 are traversed by grid current and therefore a current may flow in line 88 the line corresponding to the second binary position, thereby indicating the binary address, 010 (or 2) for row II in the memory matrix. It is observed that the absence of comparison is indicated by "ones" on all three lines, 87, 88 and 89. As will be readily appreciated, a larger decoder may be constructed to operate in the above manner for indicating the address of an agreeing row in a larger memory system.

The resultant address produced by the decoder can be useful in addressing a second memory array containing the same data at corresponding addresses. Thus a first memory can be employed to determine agreement of a data block, contained therein, with an interrogation. Then the indicated data and associated data can be withdrawn from the corresponding location in the second memory.

After the detection of the particular row in the matrix which compares with interrogating data, and after such data as may be contained in that row is read out, a redetection of the same row is prevented as follows: After read out has been accomplished, a sequence control set current is applied on line 52 to sequence control loops 10 in series. This current will tend to divide between the right hand side and the left hand side of each loop. Then, however, a sequence control set pulse is applied on sequence control line 50 through the now open location switch for the detected row and this current flows as grid current over cryotron gate 53 included in the left hand side of the sequence control loop 10 for the detected row, forcing the current from line 52 to flow in the right hand side of the loop 10. Subsequent termination of the current on sequence control set conductor 52 causes a reaction voltage in the control loop 10, setting up a clockwise persistent current in that loop. Consider the instance where row II is detected but row IV also contained information which compared with the interrogation. Subsequent to read out of the information in row II a circulating persistent current is set up in the sequence control loop for row II. A redetection of row II will be inhibited since active conductor 30 for row II serially includes a cryotron gate 54 underlying the sequence control loop 10. Repeat of the same interrogation will now detect row IV immediately since its active line 30 will no longer be rendered resistive by current in the active line 30 associated with row II.

In the FIG. 6 apparatus the inductances 85 are shown paralleled with gates 86 in the passive lines 36*a* and 36*b*. Compare current in agreeing rows, but rows non-detected due to a plural comparison, flows in these inductances.

It is understood other arrangements may be substituted wherein the paralleled passive line may, e.g., exhibit a greater inductance than the associated active line, as in the FIG. 4 embodiment, whereby current prefers to flow in the active line in the absence of a disagreement between interrogation and the data in the memory matrix row.

The memory arrangement according to the present invention, has been illustrated herein as involving a two-dimensional matrix. It is readily adaptable however, to a three-dimensional array for optimum space utilization in an appropriate supercold refrigerating means. In the three-dimensional case, further memory "planes" may be merely folded extensions of the circuitry shown.

Although the storage cells or superconducting persistent current loops employed in the illustrated embodiments of the present invention employ a coding wherein a "one" is represented by a clockwise circulating current and a "zero" is represented by a counterclockwise circulating current, other codings may be readily substituted. For example, a "one" may be indicated by a circulating current in each memory matrix loop, with an absence of a circulating current representing a "zero." The active gate conductor, 30, or sensing element detecting agreement between storage and interrogation is then placed under the side of the storage loop which carries little or no current when a stored "one" and interrogating "one" are both present as in the previous embodiments. It is apparent that either the coincidence of "ones" or coincidence of "zeros" (no current in either loop or a digit line) will leave the active gate conductor superconducting. The presence of a stored one, with no digit line current opposing it is arranged to be sufficient for rendering the underlying active gate conductor resistive for indicating lack of agreement. Likewise the presence of a digit line current (interrogating one) dividing between the two sides of a loop which contains no circulating current (indicating a zero stored) will also render the active gate conductor resistive, thereby also indicating disagreement. When using this coding, all non-queried memory column or digit positions for which no agreement is particularly sought, representing portions of data blocks not interrogated, must be energized with "dont-care" currents from the corresponding data register digit lines during the interrogating period; these "dont-care" currents each consist of a half normal current in the digit line in a direction to oppose the circulating current for a stored one on the side of the storage loop overlying the active gate conductor. A resulting half current remains in the side of the storage loop overlying the active gate conductor, which current is arranged to be insufficient for rendering resistive the underlying gate conductor. On the other hand, if the storage loop contains no circulating current (indicative of a "zero" stored), application of the "dont-care" half current will divide between each half of the loop, again leaving the underlying active gage conductor in the super-conductive state. Such a coding arrangement possesses an advantage that vacant registers are inherently set in the zero position, and the disadvantage that "dont-care" currents are required on the unused digit lines during interrogation of other lines.

The present invention enables immediate interrogation of an entire memory with immediate access to data related to the data interrogated, even though a number of comparisons are found in the memory. The confusion resulting from multiple comparisons is avoided and the various data blocks which compare with the interrogation may be read out as fast as they can be utilized. The present apparatus may be operated "on-line" in conjunction with cryogenic computers or conventional computers since access to any portion in the memory is immediate. Furthermore, no resort to a memory address system is required since access to the memory is accomplished through the medium of a related fact or tag which will ordinarily be the result of a previous computation in the computer, or which will be initially available in a data retrieval system. No memory searching or scanning is necessary to discover stored information cross-indexed to the interrogating information. No ordering of the memory information is required and moreover, the exact address of a data block in the memory is of little consequence. Information may be detected and data entered into and withdrawn from the memory non-destructively without regard to its actual physical location.

While I have shown and described several embodiments of my invention, it will be apparent to those skilled in the art that many other changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A memory apparatus comprising a memory matrix for storing a plurality of words in word locations each having a plurality of persistent current loops for representing digit positions, means for simultaneously interrogating the words of said memory matrix to detect the first of a series of words responsive to said interrogation, coupling means responsive to the detection providing immediate access to the detected word location, and means for altering an extra digit position corresponding to said detected word so that a next interrogation will detect a second responsive word in a second word location.

2. In a memory system matrix including elements arranged in a plurality of word groups and digit columns, digit column conductors coupled to digit positions of said word groups, a ranking device coupled to said word groups for detecting agreement in a predetermined order between contents of word groups and an interrogation presented upon ones of said digit column conductors, normally conducting persistent current loop location access switches associated with said word groups whose persistent current is altered by a current in said ranking device for a particular word group, and a plurality of sequence control persistent current loops associated with said word groups whose persistent current is set through the location switch associated with the same word group to prevent immediate redetection of that word group by the ranking device.

3. In a memory system matrix including elements arranged in a plurality of word groups and digit columns wherein said elements comprise cryogenic persistent current loops interconnected by digit column conductors, a ranking device including coupling means controlled by the elements of said word groups by detecting agreement between partial contents of a word group and an interrogation presented upon ones of said digit column conductors wherein such coupling means are effective to inhibit current in coupling means associated with subsequent word groups according to a predetermined order, and persistent current location switches responsive to said detection means for allowing access to said word groups in said same predetermined order.

4. The apparatus as set forth in claim 3, further including a sequence control persistent current loop inhibiting said coupling means in said same predetermined order after access is had to a word group by means of its corresponding location switch.

5. A memory matrix system comprising a first register for presenting words and information to be stored and compared; a plurality of persistent current memory devices arranged in columns and rows, means for entering persistent currents into said memory devices wherein circulating current in a first direction is indicative of one binary digit and a circulating current in the opposite direction is indicative of the opposite binary digit, column conductors interconnecting said memory devices, a plurality of superconducting coupling means each arranged to have its superconductivity destroyed by current in any of said memory devices in a particular row, said coupling means for each row being arranged in superposed relation with the coupling means for subsequent rows according to a predetermined order to destroy the superconductivity of the coupling means of said subsequent row, persistent current location switches each comprising persistent current loops associated with separate memory rows and each adapted to have its superconductivity destroyed by current in a coupling means for that row, read out means controlled by said persistent current in said location switch for a particular row so that read out access is gained to a row for which identity exists between portions of a word stored in the memory elements of such row and an interrogation presented upon said digit column conductors and a sequence control persistent current loop for each row inhibiting said coupling means for said rows in a predetermined order to prevent reaccess to the same row.

References Cited by the Examiner

UNITED STATES PATENTS

| | | | |
|---|---|---|---|
| 3,031,650 | 4/1962 | Koerner | 340—174 |
| 3,121,217 | 2/1964 | Seeber et al. | 340—174 |

OTHER REFERENCES

1959—Publication: I.B.M. General Information Manual 709–7090 Data Processing Systems, copyright by International Business Machines Corp. Entire Manual (49 pp.) relied on.

Pages 106–21, April 1961—I.B.M. Journal, A Magnetic Associative Memory, Kiseda et al.

ROBERT C. BAILEY, *Primary Examiner.*

MALCOLM A. MORRISON, *Examiner.*

P. L. BERGER, *Assistant Examiner.*